(Model.)

G. CUSTER.
Caster.

No. 240,391.  Patented April 19, 1881.

Witnesses.
A. Ruppert
James H. Lange

George Custer.
Inventor.
per Edson Bros.
Attorneys.

UNITED STATES PATENT OFFICE.

GEORGE CUSTER, OF WHITNEY, TEXAS.

CASTER.

SPECIFICATION forming part of Letters Patent No. 240,391, dated April 19, 1881.

Application filed July 29, 1880. (Model.)

*To all whom it may concern:*

Be it known that I, GEORGE CUSTER, of Whitney, in the county of Hill and State of Texas, have invented certain new and useful Improvements in Casters; and I do hereby declare the following to be a full, clear, and exact description of the invention, such as will enable others skilled in the art to which it appertains to make and use the same, reference being had to the accompanying drawings, and to letters of reference marked thereon, which form a part of this specification, in which—

Figure 1:
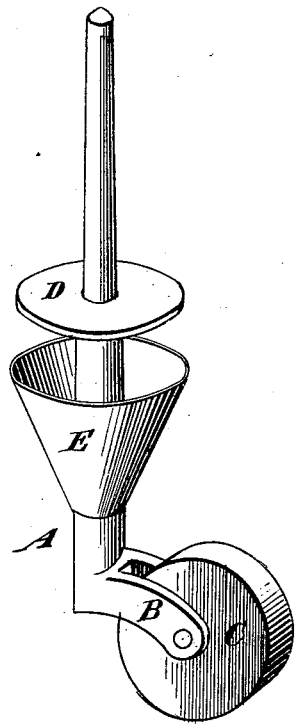
Figure 2:
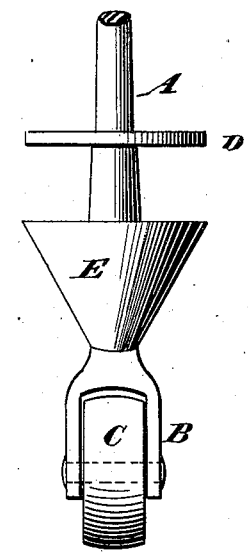
Figure 3:
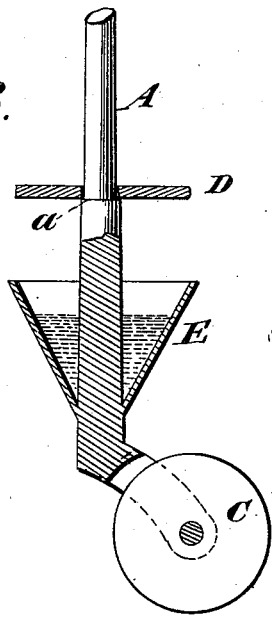

Figure 1 is a front view. Fig. 2 is a side view. Fig. 3 is a sectional view.

My invention relates to casters or rollers for bedsteads and the like; and the novelty consists in the construction and arrangement of parts, as will be more fully hereinafter set forth.

In carrying out my invention I employ the ordinary shank, bifurcated extremities, and roller. Upon the shank is formed a shoulder upon which rests a disk, as shown. This disk supports the lower surface of the bedstead, table, or the like, and operates loosely on the shank. Below the disk, and rigid with the shank, is formed a cup, the upper circumference of which approximates the radius of the disk. The cup is designed to contain poison liquid, chalk, or poison in a pulverized state, and the disk is arranged at a sufficient distance above the upper edge of the cup, to prevent vermin, bugs, ants, worms, and the like from climbing the leg of the article of furniture to which the invention is applied.

The important features of the invention are the shank having the bearing-shoulder, and the cup formed of one piece of metal, the bifurcated extremity, the journaled roller, and the loose disk.

Referring to the drawings, A represents the shank, having shoulder *a;* B, the bifurcated extremities, and C the roller.

D represents the bearing-disk, resting upon the shoulder *a* and operating loosely upon the shank A.

E represents the poison-cup, rigid with and formed upon the shank A.

The cup is intended to contain poison in liquid or powdered state, and the disk is designed to prevent the climbing of insects. They are so placed and arranged in relation to each other that it is impossible for the insect to climb the leg of the article of furniture to which it is attached, even if not poisoned by the preparation in the cup.

The operation of my invention is obvious.

I am aware that it is not new with me to employ a poison-cup upon the shank of a caster, and I am also aware that disks have been used to support legs of articles of furniture, said disks resting upon shoulders formed upon the shank; and, broadly, these features are not sought to be covered in this application.

What I claim as new, and desire to secure by Letters Patent of the United States, is—

As a new article of manufacture, the shank A, shoulder *a*, cup E, and jaws B, formed in one piece of metal, the roller C, and loose disk D, all constructed, combined, and adapted to serve in relation to the legs of furniture as and for the purposes specified.

In testimony that I claim the foregoing I have hereunto set my hand this 19th day of July, 1880.

GEORGE CUSTER.

Witnesses:
 GEO. W. CROWDER,
 J. N. COBB.